United States Patent
Suzuki et al.

(10) Patent No.: US 11,267,487 B2
(45) Date of Patent: Mar. 8, 2022

(54) DRIVING CONTROL DEVICE

(71) Applicant: TOYOTA JIDOSHA KABUSHIKI KAISHA, Toyota (JP)

(72) Inventors: Yuji Suzuki, Toyota (JP); Mutsumi Matsuura, Okazaki (JP); Tomoaki Miyazawa, Nagoya (JP); Toshiki Kindo, Yokohama (JP); Shunsuke Tanimori, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 43 days.

(21) Appl. No.: 16/929,430

(22) Filed: Jul. 15, 2020

(65) Prior Publication Data

US 2021/0031810 A1    Feb. 4, 2021

(30) Foreign Application Priority Data

Jul. 30, 2019  (JP) .............................. JP2019-139985

(51) Int. Cl.
*B60W 60/00* (2020.01)

(52) U.S. Cl.
CPC ... *B60W 60/00253* (2020.02); *B60W 2556/50* (2020.02)

(58) Field of Classification Search
CPC ................... B60W 60/00253; B60W 2556/50
See application file for complete search history.

(56) References Cited

U.S. PATENT DOCUMENTS 10,088,326 B1 * 10/2018 Aula .................... G05D 1/0088
2020/0160709 A1 * 5/2020 Ramot ............ B60W 60/00253

FOREIGN PATENT DOCUMENTS

JP          2007-192562 A    8/2007

* cited by examiner

*Primary Examiner* — James M McPherson
(74) *Attorney, Agent, or Firm* — Oliff PLC

(57) ABSTRACT

A driving control device includes a general user terminal that receives a request for a driving service for moving a vehicle to a destination by receiving, as inputs, a destination, a transit point, and a non-transit point at which the vehicle is not to be stopped, an occupant of the vehicle operation information acquisition device that receives an instruction from an occupant indicating a location where the vehicle is to be stopped, and a control device that, if the location input at the occupant operation information acquisition device of the vehicle running under the driving service corresponds to the non-transit point, causes the vehicle to pass without stopping at the location, and stops the vehicle at the location if the location does not correspond to the non-transit point.

6 Claims, 3 Drawing Sheets

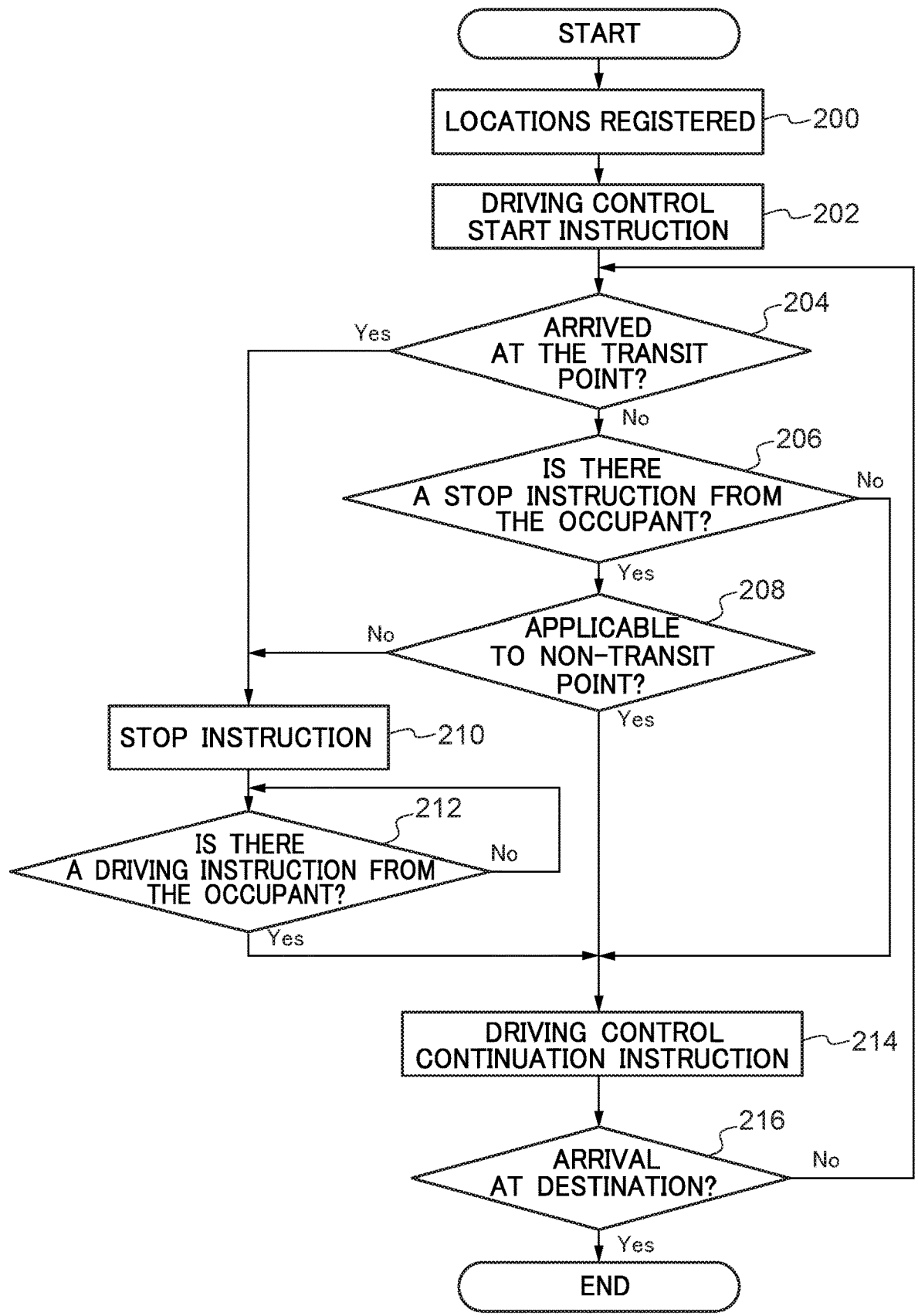

DRIVING CONTROL DEVICE

CROSS-REFERENCE TO RELATED APPLICATION

This application is based on and claims priority under 35 USC 119 from Japanese Patent Application No. 2019-139985 filed on Jul. 30, 2019, the disclosure of which is incorporated by reference herein.

BACKGROUND

Technical Field

The present disclosure relates to a driving control device for a vehicle.

Related Art

A service for transporting people or luggage by remote driving or the like in which a vehicle is controlled by a remote driver located in a remote location is being considered.

In the remote driving service, the client of the remote driving service may drive the vehicle to a predetermined destination. On the other hand, Japanese Patent Application Laid-Open No. 2007-192562 (Patent Document 1) discloses an invention of a vehicle information providing device in which a requester or a passenger of a remotely driven vehicle can add a transit point or a destination of the vehicle.

However, according to the invention described in Patent Document 1, when the requester of the remote driving service and the occupant are different, the occupant can issue an instruction to stop at a location that is undesirable for the requester. In such a case, there is a possibility that the occupant stops the vehicle at a location that is not desirable for the client and visits the location.

SUMMARY

The present disclosure has been made in view of the above-described circumstances, and has as its object to provide a driving control device that does not stop at a location that is undesirable for a client.

The driving control device according to the first aspect is a driving control device including: a general user terminal that receives a request for a driving service for moving a vehicle to a destination by receiving, as inputs, a destination, a transit point, and a non-transit point at which the vehicle is not to be stopped; an occupant operation information acquisition device that receives an instruction from an occupant indicating a location where the vehicle is to be stopped; a control device that, if the location input at the occupant operation information acquisition device of the vehicle running under the driving service corresponds to a non-transit point, causes the vehicle to pass without stopping at the location, and stops the vehicle at the location if the location does not correspond to the non-transit point.

According to the driving control device according to the first aspect, if the location input by the occupant of the vehicle corresponds to a non-transit point, at which the vehicle is not to be stopped, input by the requester of the driving service, the vehicle is made to pass without stopping at the location.

A driving control device according to a second aspect is the driving control device according to the first aspect, further including a remote control terminal for remotely controlling the vehicle, wherein the control device instructs the remote control terminal to move the vehicle to the destination, stop the vehicle at the transit point, cause the vehicle to pass without stopping at the location, or stop the vehicle at the location.

According to the driving control device according to the second aspect, the vehicle can pass through the non-transit point by transmitting the information about the non-transit point from the control device to the remote control terminal that remotely controls the vehicle.

The driving control device according to a third aspect is the driving control device according to the first aspect, wherein the vehicle is capable of autonomous traveling, and the control device instructs the vehicle to move to the destination, stop at the transit point, pass without stopping at the location, or stop at the location.

According to the driving control device according to the third aspect, by transmitting the information of the non-transit point from the control device to the vehicle that travels autonomously, the vehicle can pass without stopping at the non-transit point.

The driving control device according to a fourth aspect is the driving control device according to the second aspect, wherein the control device is a server, the server registers the destination, the transit point, and the non-transit point received by the general user terminal, gives the remote control terminal remote driving permission for the vehicle, and issues an instruction to the remote control terminal to move the vehicle to the destination, stop the vehicle at the transit point, cause the vehicle to pass without stopping at the location, or stop the vehicle at the location based on the registered destination, the transit point, and the non-transit point.

A driving control device according to a fifth aspect is the driving control device according to the fourth aspect, wherein the remote operation of the vehicle by the remote control terminal does not go through the server.

The driving control device according to a sixth aspect is the driving control device according to the third aspect, wherein the control device is a server, the server registers the destination, the transit point, and the non-transit point received by the general user terminal, and issues an instruction to the vehicle to move to the destination, stop at the transit point, pass without stopping at the location, or stop at the location based on the registered destination, the transit point, and the non-transit point.

As described above, according to the driving control device according to the present disclosure, it is possible to provide a driving control device that does not stop at a non-transit point that is an undesirable location for a client.

BRIEF DESCRIPTION OF DRAWINGS

FIG. 3 is a flowchart illustrating an example of a process of the driving control device according to the embodiment of the present disclosure.

DETAILED DESCRIPTION

Figure 1:
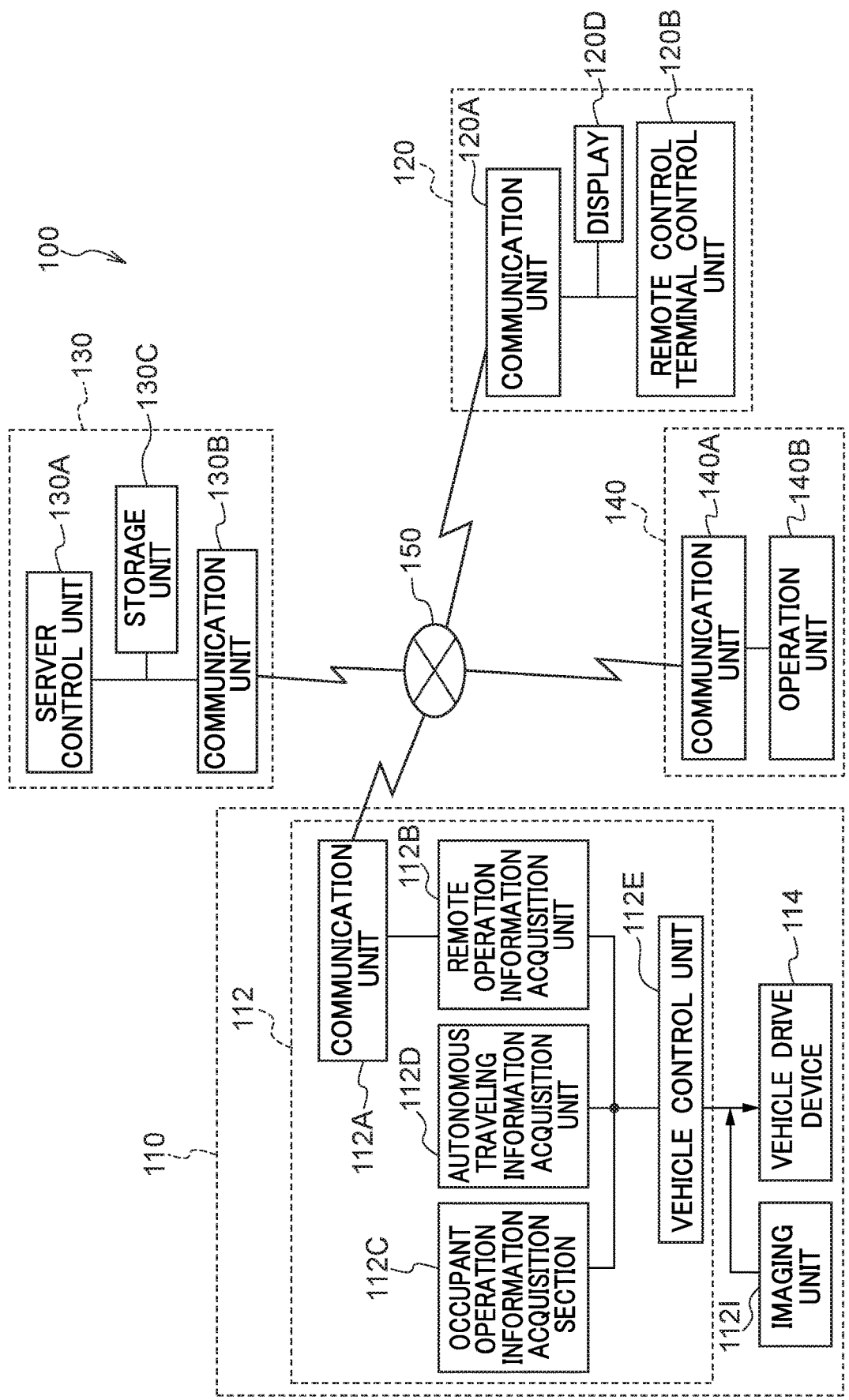
FIG. 1 is a block diagram illustrating an example of a specific configuration of a driving control device according to an embodiment of the present disclosure.

Hereinafter, the driving control device according to the present embodiment will be described with reference to FIG. 1. FIG. 1 is a block diagram illustrating an example of a specific configuration of the driving control device 100 according to the embodiment of the present disclosure.

The driving control device 100 of the present embodiment includes a vehicle 110, a remote control terminal 120, a server 130, and a general user terminal 140, as shown in FIG. 1. The vehicle 110, the remote control terminal 120, the server 130, and the general user terminal 140 are connected via a network 150. The network 150 is, for example, a wired or wireless communication network using a public line such as the Internet.

The vehicle 110 includes an ECU (Electronic Control Unit) 112 that controls the running of the vehicle, a vehicle driving device 114 that drives the vehicle in accordance with a control signal from the ECU 112, and an imaging unit 112I to acquire image data around the vehicle 110 for remote driving.

The ECU 112 functionally includes, as shown in FIG. 1, a communication unit 112A, a remote operation information acquisition unit 112B, an occupant operation information acquisition unit 112C, an autonomous traveling information acquisition unit 112D, and a vehicle control unit 112E.

The communication unit 112A transmits and receives information to and from another device. The communication unit 112A is a communication device capable of wireless communication via the network 150 by so-called V2X (vehicle-to-vehicle communication and road-to-vehicle communication).

Remote operation information acquisition section 112B acquires operation information transmitted from remote control terminal 120. The operation information transmitted from the remote control terminal 120 is operation information input to the remote control terminal 120 by the remote driver.

The occupant operation information acquisition unit 112C acquires operation information input from an occupant in the vehicle. The information input by the occupant includes the steering angle, the throttle opening amount, the depressing strength of the brake pedal, the position of the shift lever, and the like. The occupant operation information acquisition unit 112C can also instruct the server 130 where to stop the vehicle 110 while the vehicle 110 is traveling to the destination.

The autonomous traveling information acquisition unit 112D acquires information related to autonomous traveling. For example, the information regarding the autonomous traveling includes a control signal from another ECU, position information of the vehicle 110 obtained by a GPS (Global Positioning System), or various sensors (an imaging device, a laser radar sensor) mounted on the vehicle 110, etc.

The vehicle control unit 112E controls the driving of the vehicle drive device 114 based on various types of information acquired by the remote operation information acquisition unit 112B, the occupant operation information acquisition unit 112C, and the autonomous traveling information acquisition unit 112D. For example, the vehicle control unit 112E switches between remote operation, occupant operation, and autonomous traveling based on the acquired various information.

The image capturing unit 112I is an image capturing device such as a video camera that captures an image of the periphery of the vehicle 110 including the front, left, right, left, and rear of the vehicle 110. The image data around the vehicle 110 acquired by the imaging unit 112I is transmitted to the communication unit 120A of the remote control terminal 120 via the communication unit 112A and the network 150. The image data transmitted to the communication unit 120A of the remote control terminal 120 is displayed on the display unit 120D of the remote control terminal 120, and serves as visual information when the remote driver performs remote driving.

As shown in FIG. 1, the remote control terminal 120 functionally includes a communication unit 120A, a remote control terminal control unit 120B, and a display unit 120D on which images around the vehicle 110 are displayed. The remote control terminal 120 includes, for example, interfaces corresponding to a steering wheel, an accelerator pedal, a brake pedal, and a shift lever, respectively, and is configured to be capable of performing the same operation as a real vehicle. The display unit 120D is a display device such as a liquid crystal display or an organic EL (Organic Electro-Luminescence) display capable of displaying the periphery of the vehicle 110, including the front, left, right, and left sides of the vehicle 110. The display unit 120D is mounted so as to cover both eyes of the remote driver. The display unit 120D may be a kind of VR goggles that allows a remote driver to stereoscopically view an image around the vehicle 110.

The communication unit 120A is a communication device capable of performing communication via the network 150. The interface between the communication unit 120A and the network 150 may be wired or wireless.

The remote control terminal control unit 120B controls the remote control terminal 120. For example, the remote control terminal control unit 120B acquires operation information input from a remote driver. Then, the remote control terminal control unit 120B controls the communication unit 120A to transmit the operation information to the server 130.

The server 130 functionally includes a server control unit 130A, a communication unit 130B, and a storage unit 130C that stores information, as shown in FIG. 1. The communication unit 130B is a communication device capable of performing communication via the network 150. The interface between the communication unit 130B and the network 150 may be wired or wireless. The storage unit 130C stores software such as an OS (Operating System) for operating the server 130 and data necessary for the operation. As will be described later, in the present embodiment, a transit point where the vehicle 110 stops, a non-transit point where the vehicle 110 is not stopped, and a destination are registered in the remote driving service. The information on the transit point, the non-transit point, and the destination is stored in the storage unit 130C.

The server control unit 130A controls the server 130. For example, when the general user terminal 140 requests remote driving, the server control unit 130A transmits a remote driving request to the communication unit 120A of the remote control terminal 120. Further, when receipt of the request is transmitted from the remote control terminal 120, the server control unit 130A transmits the formal request and the remote driving permission grant to the communication unit 120A of the remote control terminal 120. Then, the server control unit 130A controls the communication unit 130B to transmit the request acceptance to the communication unit 140A of the general user terminal 140.

In the present embodiment, the remote control terminal 120 to which the server 130 has given remote driving permission remotely controls the vehicle 110 via the network 150. Communication between the remote control terminal 120 and the vehicle 110 may be via the server 130. On the other hand, the delay in communication and control via the server 130 may be significant. Therefore, in the present embodiment, communication between vehicle 110 and remote control terminal 120 in remote driving of vehicle 110 does not go through the server 130.

The general user terminal 140 is a personal terminal such as a PC or a portable information terminal provided with a communication unit 140A capable of communicating via the network 150. The general user who receives the benefit of the remote operation operates the operation unit 140B such as a mouse, a keyboard, or a touch panel to request the server 130 for the remote operation. The request by the operation of the operation unit 140B is transmitted from the communication unit 140A to the communication unit 130B of the server 130 via the network 150.

Further, to the communication unit 140A of the general user terminal 140, a communication such as acceptance of the request and completion of the request is transmitted from the communication unit 130B of the server 130 via the network 150.

Figure 2:
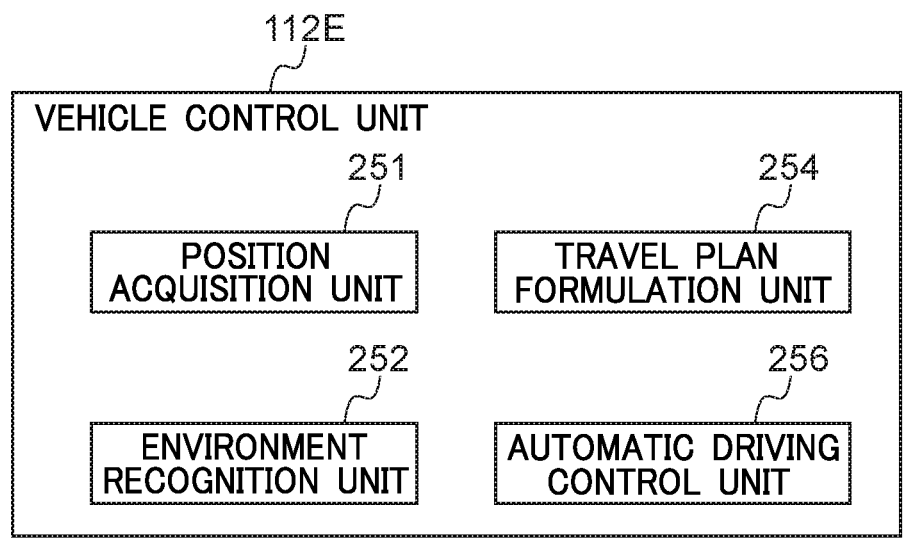
FIG. 2 is a block diagram illustrating an example of a functional configuration of a vehicle control unit.

FIG. 2 is a block diagram illustrating an example of a functional configuration of the vehicle control unit 112E. As shown in FIG. 2, the vehicle control unit 112E includes a position acquisition unit 251, an environment recognition unit 252, a travel plan formulation unit 254, and an automatic driving control unit 256. Each functional configuration is realized by the vehicle control unit 112E reading out an execution program stored in the storage device and executing the program.

The position acquisition unit 251 has a function of acquiring the current position of the vehicle 110. The position acquisition unit 251 acquires position information using a GPS or the like.

The environment recognition unit 252 has a function of recognizing a traveling environment around the vehicle 110. The environment recognition unit 252 acquires the traveling environment of the vehicle 110 as traveling environment information from sensor signals from various sensors mounted on the vehicle 110. The "running environment information" includes the weather, brightness, width of the running road, obstacles, and the like around the vehicle 110.

The travel plan formulation unit 254 has a function of drafting a travel plan of the vehicle 110 from the departure location to the destination via one or more transit points.

The automatic driving control unit 256 has a function of causing the vehicle 110 to travel in accordance with the planned travel plan while considering the position information and the travel environment information.

FIG. 3 is a flowchart illustrating an example of a process of the driving control device 100 according to the present embodiment. The process shown in FIG. 3 is performed by the server 130 when a request for the remote driving service is received from a requester of the remote driving service. The server 130 grasps the movement of the vehicle 110 based on the position information of the vehicle 110 acquired by GPS or the like. In the following processing, the remote driving service includes a case where the remote driver operates the remote control terminal 120 to drive the vehicle 110 and a case where the vehicle 110 runs autonomously.

In step 200, each of the destination, the transit point, and the non-transit point where the vehicle 110 is not stopped, which are input by the requester of the remote driving service from the general user terminal 140, are registered. If neither a transit point nor a non-transit point is entered, it is not necessary to register the transit point and the non-transit point. Information on each of the destination, the transit point, and the non-transit point registered in the server 130 is transmitted to the remote control terminal 120. When the vehicle 110 travels autonomously and heads for the destination, the information on the destination, the transit point, and the non-transit point registered in the server 130 is transmitted to the vehicle 110.

In step 202, a travelling control start instruction is transmitted to the remote control terminal 120. The remote control terminal 120 that has received the traveling control start instruction is given remote driving permission. When the vehicle 110 travels autonomously toward the destination, a travelling control start instruction is transmitted to the vehicle 110.

In step 204, it is determined whether or not the vehicle 110 has arrived at the transit point registered in step 200. Whether or not the vehicle 110 has arrived at the transit point is determined based on the position information of the vehicle 110 acquired by GPS or the like. In step 204, if the vehicle 110 has arrived at the transit point, the procedure shifts to step 210. If the vehicle 110 does not arrive at the transit point, the procedure shifts to step 206.

In step 206, it is determined whether or not the occupant of the vehicle 110 has instructed the server 130 to stop. In step 206, if there is a stop instruction, the procedure shifts to step 208, and if there is no stop instruction, the procedure shifts to step 214.

In step 208, it is determined whether or not the location where the vehicle 110 stops according to the stop instruction corresponds to the non-transit point registered in step 200. In step 208, if the stop location corresponds to a non-transit point, the procedure shifts to step 214. If the stop location does not correspond to a non-transit point, the procedure shifts to step 210.

In step 210, a stop instruction is transmitted to the remote control terminal 120. The remote driver who operates the remote control terminal 120 that has received the stop instruction stops the vehicle 110 according to the stop instruction. When the vehicle 110 travels autonomously and heads for the destination, the stop instruction is transmitted to the vehicle 110. The vehicle 110 that has received the stop instruction stops according to the instruction.

In step 212, it is determined whether or not there has been a traveling instruction from the occupant. In step 212, if there is a traveling instruction, the procedure proceeds to step 214, and if there is no traveling instruction, the determination of the presence or absence of the traveling instruction in step 212 is continued.

In step 214, a travel control continuation instruction is transmitted to the remote control terminal 120. The remote driver operating the remote control terminal 120 that has received the traveling control continuation instruction continues traveling of the vehicle 110. When the vehicle 110 travels autonomously to the destination, the travel control continuation instruction is transmitted to the vehicle 110. The vehicle 110 continues running according to the instruction.

In step 216, it is determined whether the vehicle 110 has arrived at the destination. Whether the vehicle 110 has arrived at the destination is determined based on the position information of the vehicle 110 acquired by GPS or the like. In step 216, if the vehicle 110 has arrived at the destination, the process ends, and if the vehicle has not arrived at the destination, the procedure moves to step 204.

As described above, according to the present embodiment, if the stop position instructed by the occupant of the vehicle to be driven remotely or independently corresponds to a non-stop position that is input by the requester of the remote driving service or the independent driving service, the vehicle 110 passes through the position specified by the occupant without stopping. Therefore, it is possible to perform driving control without stopping at a location that is not desirable for the client.

Incidentally, the general user terminal in the claims corresponds to the general user terminal 140 of the detailed description of the disclosure of the specification. The occupant operation information acquisition device according to the claims corresponds to an occupant operation information acquisition unit 112C in the detailed description of the specification. The control device in the claims corresponds to a server 130 in the detailed description of the disclosure of the specification. The remote control terminal in the claims corresponds to the remote control terminal 120 in the detailed description of the disclosure of the specification.

What is claimed is:

1. A driving control device comprising:
    a general user terminal that receives a request for a driving service for moving a vehicle carrying an occupant to a destination by receiving, as inputs, a destination, a transit point, and a non-transit point at which the vehicle is not to be stopped;
    an occupant operation information acquisition device that receives, as input, an instruction from the occupant in a state in which the occupant is riding the vehicle to the destination indicating a location where the vehicle is to be stopped; and
    a control device that:
    (i) when the location input by the occupant at the occupant operation information acquisition device of the vehicle with the occupant riding the vehicle to the destination and running under the driving service corresponds to the non-transit point, causes the vehicle to pass through the location input by the occupant without stopping at the location, and
    (ii) when the location input by the occupant at the occupant operation information acquisition device of the vehicle with the occupant riding the vehicle to the destination and running under the driving service does not correspond to the non-transit point, stops the vehicle at the location.

2. The driving control device according to claim 1, further comprising a remote control terminal for remotely controlling the vehicle, wherein the control device instructs the remote control terminal to move the vehicle to the destination, stop the vehicle at the transit point, cause the vehicle to pass without stopping at the location, or stop the vehicle at the location.

3. The driving control device according to claim 1, wherein the vehicle is capable of autonomous traveling, and the control device instructs the vehicle to move to the destination, stop at the transit point, pass without stopping at the location, or stop at the location.

4. The driving control device according to claim 2, wherein the control device is a server, the server registers the destination, the transit point, and the non-transit point received by the general user terminal, gives the remote control terminal remote driving permission for the vehicle, and issues an instruction to the remote control terminal to move the vehicle to the destination, stop the vehicle at the transit point, cause the vehicle to pass without stopping at the location, or stop the vehicle at the location based on the registered destination, the transit point, and the non-transit point.

5. The driving control device according to claim 4, wherein the remote operation of the vehicle by the remote control terminal does not go through the server.

6. The driving control device according to claim 3, wherein the control device is a server, the server registers the destination, the transit point, and the non-transit point received by the general user terminal, and issues an instruction to the vehicle to move to the destination, stop at the transit point, pass without stopping at the location, or stop at the location based on the registered destination, the transit point, and the non-transit point.

* * * * *